United States Patent [19]

Moore et al.

[11] 4,086,876
[45] May 2, 1978

[54] AQUARIUM-TERRARIUM STRUCTURE

[76] Inventors: Leon Moore, 3922 W. Lexington St.; George E. Smith, Jr., 4220 W. Gladys, both of Chicago, Ill. 60624

[21] Appl. No.: 707,201

[22] Filed: Jul. 21, 1976

[51] Int. Cl.² .............................................. A01K 64/00
[52] U.S. Cl. ............................................ 119/5; 47/69
[58] Field of Search .................. 119/5; 47/69; D30/9; 220/287

[56] References Cited

U.S. PATENT DOCUMENTS

| | | | |
|---|---|---|---|
| D. 83,044 | 1/1931 | Jensen | D30/9 |
| 1,333,454 | 3/1920 | Sato | 119/5 |
| 2,002,380 | 5/1935 | Wernicke et al. | 47/69 |
| 2,300,776 | 11/1942 | Collins | 47/69 |
| 3,903,642 | 9/1975 | Yellin | 47/69 |

*Primary Examiner*—Hugh R. Chamblee
*Attorney, Agent, or Firm*—Neuman, Williams, Anderson & Olson

[57] ABSTRACT

A unique cover is provided for connecting an aquarium to provide effective regulation of the environment therein whereby the structure may serve as a terrarium. The cover includes a cover member which is adapted to overlie a typical aquarium tank or vessel, and a continuous frame support member extending around the periphery of the cover member and adapted to abut with the tank when the cover is in place. The cover member is provided with at least one opening, into which ventilation control pieces are positioned. The ventilating pieces may be selectively adjusted to control the ventilation of the aquarium or terrarium. The support member, being continuous, provides a substantially moisture impermeable seal with the tank when the cover is in position.

8 Claims, 5 Drawing Figures

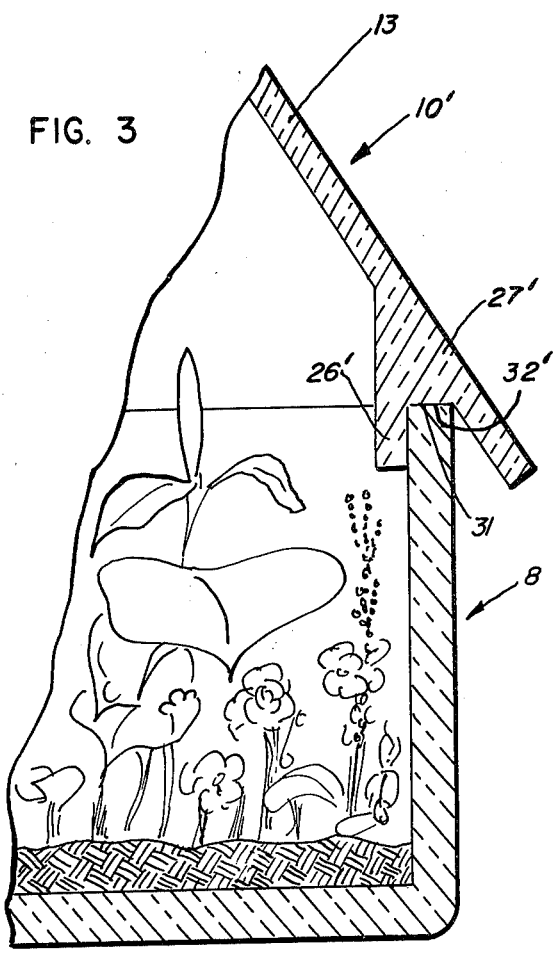
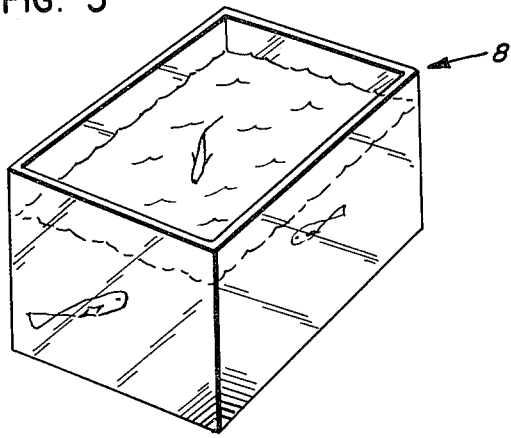
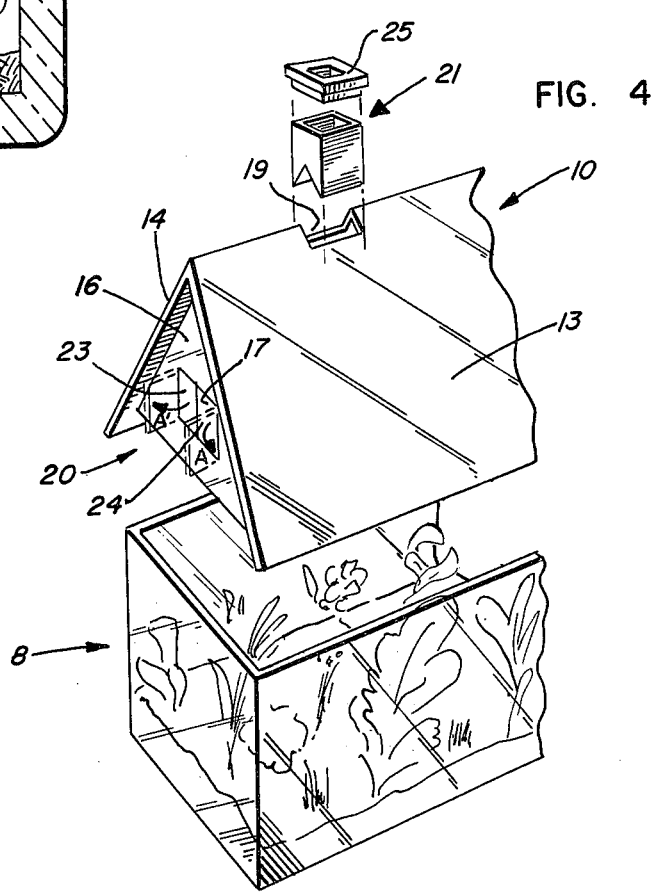

AQUARIUM-TERRARIUM STRUCTURE

BACKGROUND OF THE INVENTION

This invention relates to aquarium/terrarium structures, and more particularly to covers for effectively regulating the environment in the covered vessel, that may then serve as a terrarium. The subject cover provides for simple conversion of an aquarium into a terrarium and also augments the aesthetics of the unit.

In a terrarium, it is necessary to regulate the temperature and humidity of the environment. The same may be true for an aquarium, particularly as to temperature. In addition, it is desirable to provide a cover which may be easily and quickly removed and replaced for ease of access to the contents of either unit, and it is desirable that the unit have an aesthetic appearance.

Prior cover units for aquariums or terrariums have often required special cover-holding pieces, called for a plurality of components, failed to assure a moisture impermeable seal with the tank, or have been bulky, unattractive, and difficult to remove.

OBJECTS OF THE INVENTION

It is an object of the present invention to provide an improved, low cost, and simplified means for converting an aquarium to a terrarium.

It is a further object to provide a conversion structure which will effectively regulate the environment within the enclosure.

It is another object of this invention to provide an aquarium/terrarium cover capable of self-location on the aquarium tank, and which forms a substantially moisture impermeable seal with the tank.

It is a further object of the invention to provide a cover which may selectively regulate the ventilation of interior portions of the structure while augmenting its aesthetic appeal.

SUMMARY OF THE INVENTION

These objects are achieved by a conversion cover which, according to a preferred embodiment of the invention, includes a transparent roof-shaped cover member. Openings are provided in the cover member, into which selectively movable ventilation control pieces are mounted. Extending around a peripheral portion of the cover member is an inwardly extending continuous support shoulder. When the cover is placed over a tank or vessel, the support shoulder and adjacent portions of the cover act to properly position the cover while insuring a substantially moisture impermeable seal with the tank.

For a more complete understanding of this invention, reference should now be had to the embodiments illustrated in greater detail in the accompanying drawings and described below by way of an example of the invention.

IN THE DRAWINGS

FIG. 3 is an enlarged fragmentary sectional view of another embodiment of the invention;

FIG. 4 is a fragmentary perspective view of the unit in FIG. 1, with various components shown in exploded relation; and FIG. 5 is a perspective view of an aquarium tank, shown utilized as an aquarium.

While the invention will be described in connection with a preferred embodiment, it will be understood that it is not intended to be limited thereto. On the contrary, it is intended to cover all alternatives, modifications and equivalents as may be included within the spirit and scope of the invention as defined by the appended claims.

DESCRIPTION OF THE PREFERRED EMBODIMENT

Figure 1:
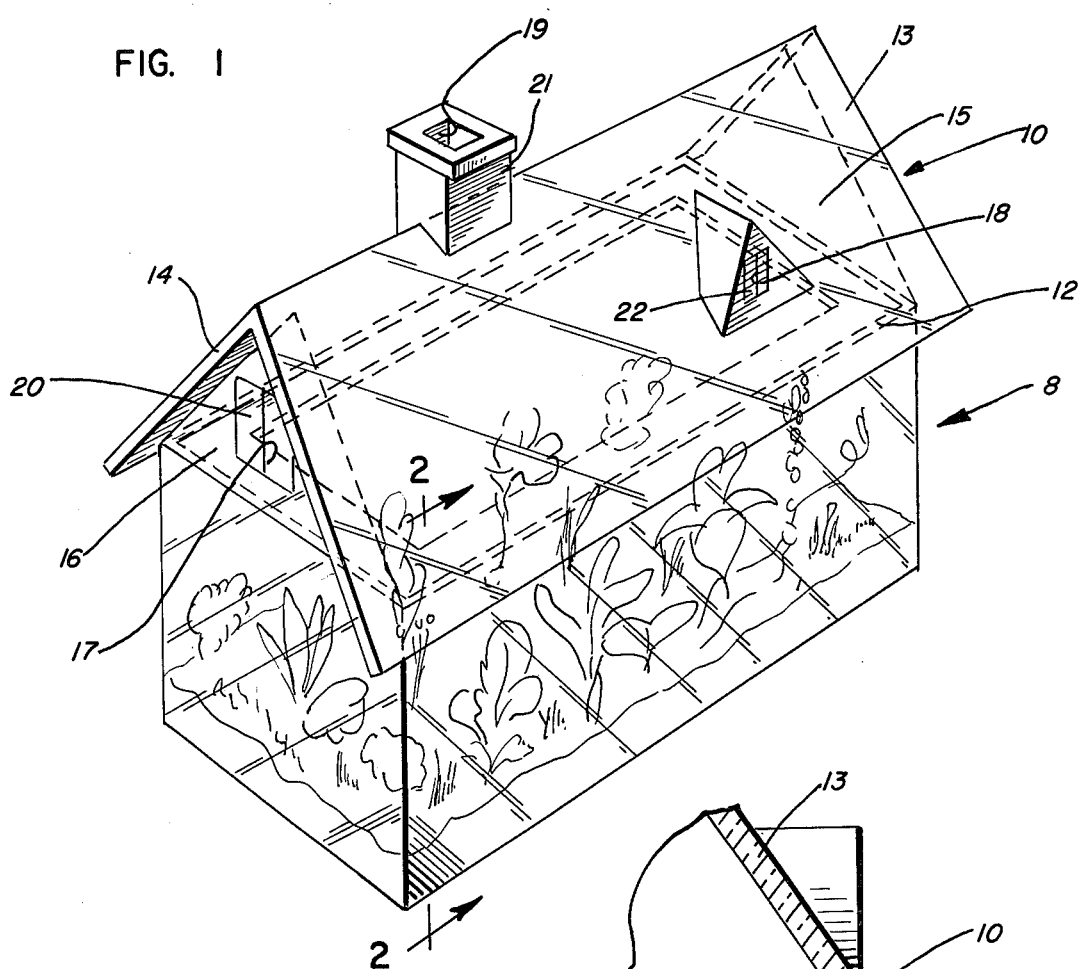
FIG. 1 is a perspective view of the preferred embodiment of an aquarium or terrarium cover embodying principles of this invention, shown in place over an aquarium tank being utilized as a terrarium.

Turning now to the drawings, FIG. 5 shows a typical aquarium tank 8 before being converted to a terrarium by way of the disclosed invention. FIG. 1 shows the tank 8 as converted to a terrarium by application of the preferred embodiment of a cover 10 according to the invention.

The cover 10 is adapted to be placed over an aquarium tank 8 of conventional design or other suitable receptacle, to form a terrarium. A substantially moisture impermeable seal occurs at the juncture 12 between the cover 10 and the tank 8. The cover 10 preferably is constructed of a clear plastic material, and is formed into an inverted V-shape, including roof portions 13 and 14, and end pieces 15 and 16, so as to give the outward appearance of a roof structure. Openings 17, 18, 19 are provided in the cover 10, and are adapted to receive ventilation control pieces 20, 21 and 22. The ventilation control pieces, of which two are shown at 20 and 21 in FIG. 4, are provided with control portions 23, 24 and 25 which may be selectively positioned to regulate the passage of air and moisture to and from the interior of the enclosure.

Control portions or shutters 23 and 24 are pivotally mounted along one edge on the end piece 16 so as to swing in the directions indicated by arrows A and A'. Thereby, the shutters may be manually adjusted to a variety of positions. The window pieces 22 may be mounted or manipulated in a similar manner. Chimney cap 25 is adapted to fit within the chimney 21, so as to restrict the passage of air and moisture therethrough.

Figure 2:
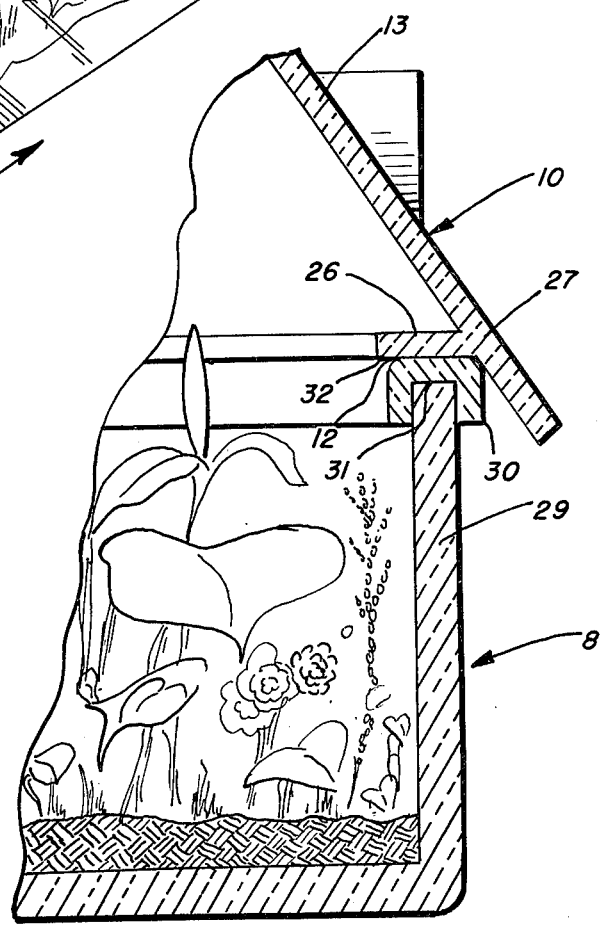
FIG. 2 is an enlarged fragmentary sectional view taken along line 2—2 of FIG. 1.

As best shown in FIG. 2, a flange 26 extends completely around a peripheral portion 27 of the cover 10. This flange is permanently affixed to the roof portions and end pieces, and extends inwardly from the inner surface thereof to define a horizontal uniplanar support shoulder. Thus, the support flange 26 provides a support surface 32 which will extend substantially perpendicular to the upstanding walls 29 of the tank 8 when in place thereover. At the same time, the flange 26 is orientated so as to maintain the cover 10 in its aligned upright position on the tank 8. The lower portion of the cover, below flange 26, provides a cam-like effect to ensure proper positioning of the cover on the tank. A moisture impermeable seal is effectuated at the juncture 12 of the tank 8 with the flange 26. A rubber strip 30 or the like may be provided on the upper edge 31 of the tank 8 or on the surface 32 of flange 26 to augment the sealing effectiveness.

A portion of an alternate form of the conversion cover 10' is shown in FIG. 3. Therein, a flange 26' extends angularly downwardly from a peripheral portion 27' of the cover so as to engage the upper and inner portions of the edge 31 when in place on the tank 8. As such, the cover 10' engages the tank 8 along undersurface of the shoulder 32', with the edge 31 of tank 8 being closely adjacent to the downwardly extending flange 26'. Because the cover 10 extends downwardly and outwardly from its juncture with the shoulder, the cover 10' will be aligned and securely held in place between the flange and the lower peripheral portion 27' of the cover.

The shoulder flange 26 of FIG. 2 and the shoulder and flange 26' of FIG. 3 may be integrally formed with the roof portions or may be separately formed and suitably attached to those portions.

It should be understood that the cover as described above, functions not only to effectively regulate heat and moisture flow to and from the enclosure, but augments the outward appearance of the unit when in place. Thus, the cover provides environmental control and the unit will function as an effective terrarium while presenting an interesting appearance. The ventilation control pieces, for example, may take the form of a chimney, a dormer window, or side windows. Further, when in place over the tank, the cover provides additional growing area for plants rooted within the enclosure.

It should be understood that the foregoing description is intended merely to be illustrative of the invention and that other embodiments and modifications thereof will be apparent to those skilled in the art without departing from its spirit. Having thus described the invention, what is claimed is:

We claim:

1. A removable environment-regulating covering device for use over a receptacle having an upstanding edge, comprising a cover member dimensioned to overlay the receptacle, said cover member including planar end portions and side roof portions, said roof portions having edge portions with undersurfaces extending angularly downwardly and outwardly beyond the receptacle's upstanding edge and adapted to facilitate gripping and placement of said cover member over the receptacle, at least one of said roof portions being provided with at least one opening therein adapted to receive adjustable ventilation control pieces, and a continuous support member extending inwardly from said roof portions at an angle relative thereto and inwardly from said end portions, said support member cooperating with said edge portion undersurfaces to facilitate proper positioning of said cover member over the receptacle and being adapted to rest on the upper edge of said receptacle to effectively enclose said receptacle, whereby said support member maintains said cover member in place on such a receptacle and provides a substantially moisture impermeable juncture with the receptacle, said ventilation control pieces being selectively adjustable for controlling ventilation of the interior portions of the resulting enclosure.

2. The device of claim 1 wherein said support shoulder extends substantially horizontally from said cover member, being integral therewith, to engage such a receptacle when in place thereon.

3. The device of claim 1, including a support flange which extends substantially vertically from said shoulder, said covering device being adapted to engage such a receptacle between said flange and an underside of the peripheral portion of said cover.

4. The device of claim 3 wherein said cover member has portions thereof extending angularly downwardly beyond said support shoulder and which co-act with the upper edge of said receptacle to accurately locate said device on said receptacle.

5. The device of claim 1 wherein portions of said ventilation pieces may be moved to selectively regulate the passage of air to or from the structure.

6. The device of claim 1 wherein said device converts an aquarium tank into a terrarium.

7. The device of claim 1, wherein said cover member is of an inverted V-shape.

8. An environment-regulating device comprising, in combination, a receptacle member having an upstanding edge, a cover member dimensioned to overlay said receptacle and including planar end portions and side roof portions, said roof portions having edge portions with undersurfaces extending angularly downwardly and outwardly beyond said receptacle edge and being adapted to facilitate gripping and placement of said cover member over said receptacle, at least one of said roof portions being provided with at least one opening therein adapted to receive adjustable ventilation control pieces to selectively control ventilation of the interior portions of the resulting enclosure, and a continuous sealing support member extending inwardly from said roof portions at an angle relative thereto and inwardly from said end portions, said support member cooperating with said edge portion undersurfaces to facilitate proper positioning of said cover member over said receptacle and being adapted to rest on said receptacle edge and establish a substantially moisture impermeable seal therewith.

* * * * *